A. F. JENKINS.
ACETYLENE GENERATING SYSTEM FOR TRAIN AND VEHICLE LIGHTING.
APPLICATION FILED AUG. 7, 1912.
1,096,247.
Patented May 12, 1914.
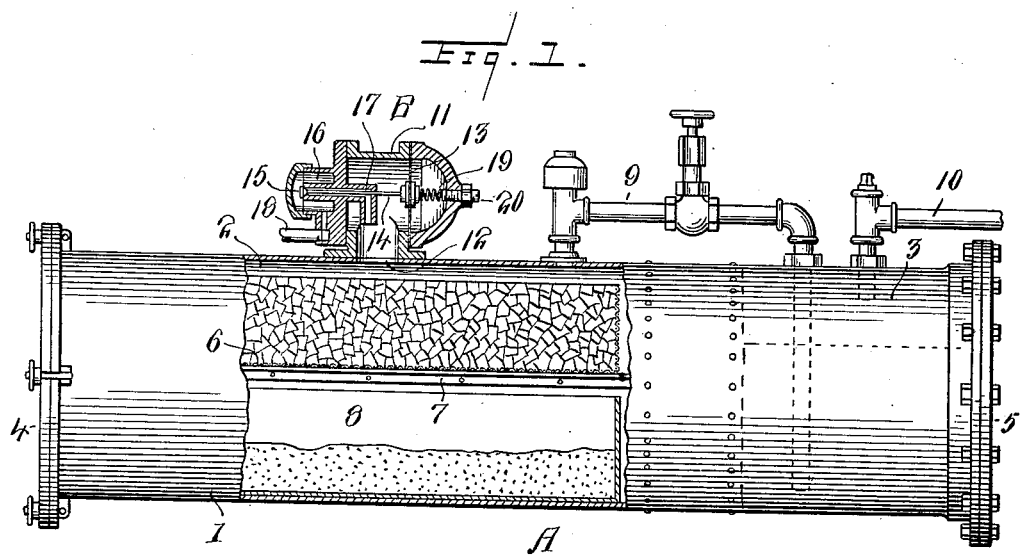
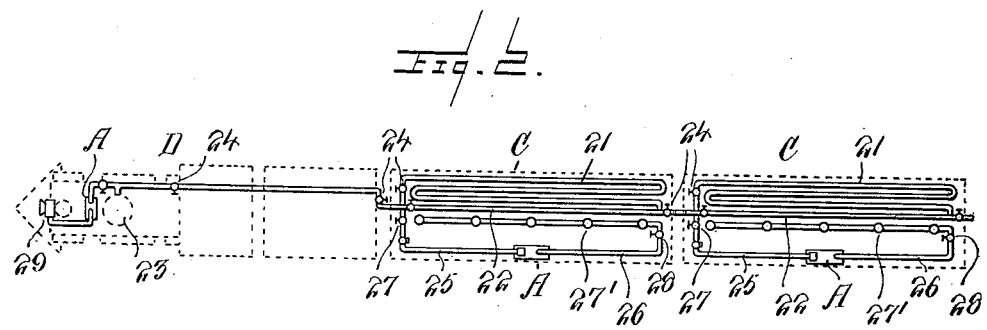

UNITED STATES PATENT OFFICE.

ALEXANDER F. JENKINS, OF BALTIMORE, MARYLAND.

ACETYLENE-GENERATING SYSTEM FOR TRAIN AND VEHICLE LIGHTING.

1,096,247.  Specification of Letters Patent.  Patented May 12, 1914.

Application filed August 7, 1912. Serial No. 713,820.

*To all whom it may concern:*

Be it known that I, ALEXANDER F. JENKINS, a subject of the King of Great Britain, residing at Baltimore city, State of Maryland, have invented certain new and useful Improvements in Acetylene-Generating Systems for Train and Vehicle Lighting, of which the following is a specification.

This invention relates to an acetylene gas generating system in which steam or other vapor is used to react on the carbid to produce the gas.

The main object of the invention is the provision of a thoroughly efficient inexpensive and simple gas generating system which is adapted for a large variety of uses, and so designed that it can produce gas automatically in any required quantity at a predetermined pressure and can be attended to by any one of ordinary skill.

The system is especially useful for lighting trains, passenger coaches, locomotive headlights, steam shovels, dredges, vessels and automobiles that have a continuous source of steam from which the acetylene gas generator or generators can be supplied.

Where a ready supply of steam is not available, the system may be equipped with its own means for generating vapor, as for instance, steam can be generated by means of a heating coil or the like heated by a burner or by the exhaust from an internal combustion engine, the latter arrangement being particularly adaptable for automobiles and motor boats employing internal combustion engines.

The system, when applied to oxyacetylene metallurgical processes, is equipped with its own or other steam generator that delivers steam in suitable quantity to generate acetylene gas at the desired pressure for combining with the oxygen to produce the fusing flame.

Another application of the system is in connection with house lighting where heat can be obtained from the heating plant in the cold seasons and from an electric circuit in the warm seasons, the heat being utilized to maintain a vaporizer at the necessary temperature to convert small quantities of water into vapor or steam in order to act on the carbid to produce the acetylene gas. On the same principle, electrically propelled street and interurban cars can be lighted by acetylene gas by utilizing electric current to heat the vapor generator that supplies the steam to re-act on the carbid.

In the accompanying drawings, Figure 1 is a view partly in section of one form of steam acetylene generator. Fig. 2 is a diagrammatic view representing, in plan, a combined heating and acetylene lighting system for trains and lighting system for the headlight of a locomotive. Fig. 3 is a side view of a passenger coach equipped with the combined heating and acetylene lighting system. Fig. 4 is a detail view showing automatic means for supplying fluid to the generator when the supply of steam thereto is interrupted.

Referring to Fig. 1 of the drawing, A designates the acetylene generator which comprises a cylinder or casing 1 which is preferably divided into a generating chamber 2 and a washer chamber 3, the ends of the cylinders being closed by heads 4 and 5. The head 4 is adapted to be removable to afford access to the generating chamber in which is a carbid basket 6 supported on bars 7 and under the basket is a pan 8 into which the residue drops. The gas passes from the generating chamber 1 through a pipe 9 to the washer chamber 3, wherein the gas is washed before passing through the outlet pipe 10.

Steam is admitted to the generating chamber through a valve mechanism B that comprises a casing 11 that communicates with the chamber 2 through an opening or port 12. In the casing 11 is a diaphragm 13 which is subjected to the pressure of the gas and acts through a rod 14 on a valve 15 which controls the flow of steam from the chamber 16 to the interior of the casing 11, the steam passing through a conduit 17. Steam is taken from any suitable source and supplied to the chamber 16 through a pipe 18. Behind the diaphragm 13 is a spring 19 having an adjusting screw 20 which is capable of setting the diaphragm and spring at different tensions so that the valve 15 will open and close at any desired gas pressure.

In operation, the pressure of the gas in the valve casing 11 presses the diaphragm outwardly against the tension of the spring and holds the valve closed when no gas is being consumed, but when the pressure of the gas lowers, the valve 15 opens to a slight degree so that steam flows through the passage 17 and port 15 to act on the carbid, thereby generating more gas to supply the demand, and whenever the pressure tends to exceed a predetermined amount, the valve 15 automatically closes to cut off the supply of steam and interrupt the generation of more gas. Thus, the quantity of gas generated will be in proportion to the demand and the pressure will be maintained substantially constant.

In Fig. 2, C designates passenger coaches connected with a locomotive D. The coaches C are, as usual, equipped with heating coils 21 which are connected with the train pipe 22 that supplies steam to the coils from the dome 23 of the locomotive, there being suitable valves 24 in the train pipe and coils for controlling the flow of steam. Each coach is equipped with a generator A that is connected by a pipe 25 with the main supply of train pipe 22 so that steam can be derived from the car heating system for producing the acetylene gas in the generator A, which gas flows through a service pipe 26 to the lamps 27' in the car. The pipes 25 and 26 are equipped with controlling valves 27 and 28. The generators A can be readily applied to car heating and lighting systems already in use as it is merely necessary to install the generators on the cars and connect them with the pipes that supply the heating coils with steam and the lamps with gas. A generator A may also be provided on the locomotive to supply gas to the headlight 29, said generator being also connected with the boiler of the locomotive to receive a supply of steam therefrom.

In Fig. 3, the arrangement of the generator on the individual cars is better shown. In lighting vessels, steam may be taken from the boiler for the engines or from the heating system and in steam-propelled automobiles the steam for the acetylene generator may be derived from the boiler.

It may be desirable to provide means whereby the generation of gas may be continued when the source of steam supply is interrupted, as for instance, when a passenger coach is disconnected from a locomotive which supplies the steam to the acetylene generators on the cars. For this purpose, a source of fluid 30ª, Fig. 3, may be connected by a pipe 31 with the valve device B of the generator A, and in this valve 31 is arranged a valve 30 which is controlled by a pressure-responsive device 32, which is acted on by steam from the pipe 25, through the pipe 33. When steam is being supplied to the generator through the pipe 25, the pressure of the steam will act on the device 32 and cause the valve 30 to close so that the source of fluid 30ª will be cut off from the generator A. When the pressure of the steam in the pipe 25 drops, as for instance, when the passenger coach is disconnected from the locomotive, the valve 30 will open automatically and supply fluid to the generator so that acetylene gas will be generated as long as there is need for gas. A check valve 34 is provided in the valve 25 to prevent fluid from flowing into the pipe 25 in a direction away from the generator. The source of fluid supply 30ª may be a tank of water, an auxiliary steam generator or the like.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a gas generating and lighting system for vehicles, the combination of a vehicle, a source of steam carried by the vehicle, an acetylene generator and a gas washer combined into a unitary structure mounted on the vehicle with the former receiving steam from such source, a lamp on the vehicle receiving gas from the washer, and automatically-actuated means for controlling the supply of steam to the generator to vary the volume of gas in accordance with the demand therefor.

2. In a gas generating and lighting system for vehicles, the combination of a vehicle, a source of steam carried by the vehicle, an acetylene generator on the vehicle receiving steam from such source, a lamp on the vehicle receiving gas from the generator, automatically-actuated means for controlling the supply of steam to the generator to vary the volume of gas in accordance with the demand therefor, and means controlled by the pressure of the steam for opening a supply of fluid to the generator when the supply of steam to the latter is interrupted.

3. In a steam generating and lighting system for vehicles, the combination of a vehicle, a source of steam thereon, an acetylene generator on the vehicle, means responsive to the pressure of the acetylene for controlling the supply of steam to the generator, a source of fluid on the vehicle, a pipe leading from the said source of fluid to the generator, a valve for interrupting the flow of fluid to the generator while steam is supplied to the latter, and means for automatically controlling the said valve by the pressure of the steam supply whereby fluid is supplied to the generator when the steam supply is interrupted for permitting a continuous generation of acetylene.

4. A lighting system for a train consisting of a locomotive and independent cars, said system comprising a steam main extending from a steam generator through the cars and consisting of coupled sections, there being a section on the locomotive and on each car, an independent acetylene generator on each car, a connection on each car extending from the steam main to each generator to supply steam thereto for generating acetylene gas, an independent gas pipe and lamp or series of lamps on each car connected with the generator thereon, and means for independently controlling the supply of steam to each generator in proportion to the amount of gas consumed by the lamp or lamps connected therewith.

In testimony whereof I affix my signature in presence of two witnesses.

ALEXANDER F. JENKINS.

Witnesses:
A. THOMPSON,
C. N. POLLARD.

Copies of this patent may be obtained for five cents each, by addressing the "Commissioner of Patents, Washington, D. C."